(12) United States Patent
Schirmer et al.

(10) Patent No.: US 7,134,334 B2
(45) Date of Patent: Nov. 14, 2006

(54) INTEGRATED FASTENER AND MOTION DETECTOR

(75) Inventors: Mark L. Schirmer, Stoughton, MA (US); Thomas W. Kelly, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/849,605

(22) Filed: May 20, 2004

(65) Prior Publication Data

US 2005/0257614 A1    Nov. 24, 2005

(51) Int. Cl.
  *G01P 1/02*   (2006.01)
  *G01P 15/08*  (2006.01)
  *G01D 21/00*  (2006.01)

(52) U.S. Cl. .................. 73/493; 73/866.5; 73/654

(58) Field of Classification Search ............ 73/493, 73/431, 866.5, 654
See application file for complete search history.

(56) References Cited

U.S. PATENT DOCUMENTS

| | | | | |
|---|---|---|---|---|
| 4,347,743 A | * | 9/1982 | Rausche et al. | 73/654 |
| 4,823,602 A | * | 4/1989 | Christensen, Jr. | 73/661 |
| 4,947,690 A | * | 8/1990 | Cleveland | 73/654 |
| 5,062,310 A | * | 11/1991 | Eaton | 73/866.5 |
| 5,847,278 A | * | 12/1998 | Judd | 73/493 |
| 5,918,292 A | * | 6/1999 | Smith | 73/866.5 |
| 5,939,633 A | | 8/1999 | Judy | 73/514.32 |
| 6,029,530 A | * | 2/2000 | Patton et al. | 73/866.5 |
| 6,202,491 B1 | * | 3/2001 | McCarty et al. | 73/659 |
| 6,205,872 B1 | * | 3/2001 | Pflueg | 73/866.5 |
| 6,435,902 B1 | * | 8/2002 | Groh et al. | 439/527 |
| 6,484,589 B1 | * | 11/2002 | Brock | 73/861.18 |
| 6,505,511 B1 | | 1/2003 | Geen et al. | 73/504.12 |
| 6,711,951 B1 | * | 3/2004 | Kicher et al. | 73/493 |
| 6,851,306 B1 | * | 2/2005 | Shost et al. | 73/119 R |
| 6,964,209 B1 | * | 11/2005 | Robinson et al. | 73/866.5 |

* cited by examiner

*Primary Examiner*—Helen Kwok
(74) *Attorney, Agent, or Firm*—Bromberg & Sunstein LLP

(57) ABSTRACT

A motion detector capable of sensing motion of an object includes a motion sensor secured to one of a plurality of surfaces of a fastener. The fastener is directly coupleable with the object.

20 Claims, 3 Drawing Sheets

INTEGRATED FASTENER AND MOTION DETECTOR

RELATED APPLICATIONS

This patent application is related to co-pending U.S. patent application Ser. No. 10/849,578, filed on even date herewith, entitled, "MOTION DETECTOR AND METHOD OF PRODUCING THE SAME," and naming Mark L. Schirmer and Thomas W. Kelly as inventors, the disclosure of which is incorporated herein, in its entirety, by reference.

FIELD OF THE INVENTION

The invention generally relates to motion detectors and, more particularly, the invention relates to motion detectors and devices for coupling motion detectors to external objects.

BACKGROUND OF THE INVENTION

A variety of different applications use motion sensors to detect the motion of an underlying object. One widely used application involves detecting the motion of an automobile. Specifically, motion sensors often are mounted about the periphery of an automobile chassis to sense pre-specified accelerations or rotations. Those in the art typically refer to such sensors as "satellite sensors."

When a satellite sensor detects a pre-specified type of motion, systems within the automobile respond in an pre-specified manner. For example, if a satellite sensor detects a sudden and high deceleration, air-bag systems may deploy their air bags. Alternatively, if a satellite sensor detects a sudden rotation (e.g., the automobile is swerving), breaking systems may selectively break to avoid a rollover. Accordingly, satellite sensors have become critical in ensuring automobile safety.

Currently available satellite sensors typically have a relatively large housing that contains both a printed circuit board with electronics for detecting motion, and a mounting device (e.g., bushings) for mounting the housing to the automobile. Moreover, to facilitate mounting, the housing generally is molded to a shape that conforms to the specific geometry of the portion of the chassis to which it is to be mounted. Use of such a satellite sensor, however, is undesirable for a number of reasons. For example, its relatively large size, specialized shape, and high number of electronic components drives up its overall cost. As a further example, such a satellite sensor also undesirably may mechanically filter signals used in high frequency applications.

SUMMARY OF THE INVENTION

In accordance with one aspect of the invention, a motion detector capable of sensing motion of an object (to which it is attached) includes a motion sensor secured to one of a plurality of surfaces of a fastener. The fastener is directly coupleable with the object.

In illustrative embodiments, the motion sensor comprises a package that is secured to one of the plurality of surfaces of the fastener. Such surface may be an internal or external surface. For example, the fastener may have a shaft forming an interior surface to which the motion sensor is secured. The interior surface may define a bore that is filled with a fill material. The fastener, which can be a bolt or other type of fastener, may have an outer surface with at least one thread for mating with a corresponding female structure.

The motion sensor illustratively has a sense axis that either is substantially parallel to or substantially normal with the longitudinal axis of the fastener. The motion sensor also may include connect detection circuitry that is capable of determining if the fastener is coupled with the object. The connect detect circuitry can be in electrical communication with one of the plurality of surfaces of the fastener.

In accordance with another aspect of the invention, a method of producing a motion detector provides a fastener having a plurality of surfaces, and directly secures a motion sensor to one of the plurality of surfaces.

The method also may form a bore in the fastener. In such case, the motion sensor may be secured within the bore. After the motion sensor is secured within the bore, the bore may be filled with a fill material. In illustrative embodiments, the motion sensor has a sense axis and the fastener includes a longitudinal axis. The sense axis of the motion detector may be aligned to be either substantially parallel to or substantially normal to the longitudinal axis of the fastener.

In accordance with another aspect of the invention, a motion detector capable of sensing motion of an object has a motion sensor and a fastener having an interior. The fastener is directly coupleable with the object, while the motion sensor is within the interior of the fastener.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a satellite sensor integrates an inertial sensor and a fastener into a single, compact unit. No additional housing or like apparatus thus is required to contain the inertial sensor. Consequently, a technician can more flexibly and easily mount the satellite sensor to an underlying apparatus (e.g., an automobile chassis) while maintaining its measurement fidelity. Details of various embodiments are discussed below.

Figure 1:
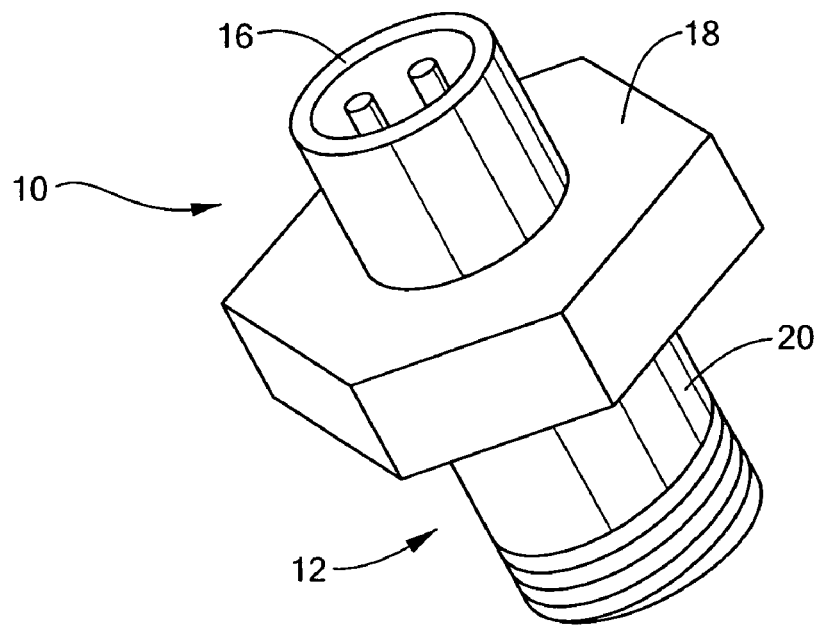
FIG. 1 schematically shows a satellite sensor implementing illustrative embodiments of the invention.

FIG. 1 schematically shows a satellite sensor 10 implementing illustrative embodiments of the invention. Among other functions, the satellite sensor 10 may detect sudden decelerations as a part of an automobile airbag system. Accordingly, when the satellite sensor 10 senses a sudden deceleration, the system deploys its airbags. In another implementation, the satellite sensor 10 may detect sudden rotations as a part of an anti-lock braking system in an automobile. Accordingly, when the satellite sensor 10 detects sudden rotations, the braking system applies selected braking in an effort to stabilize the automobile. The satellite sensor 10 also may detect vibrations conducted through the chassis of an object to which it is attached (e.g., an motor vehicle).

To those ends, the satellite sensor 10 has a fastener 12 for securing to an underlying apparatus (e.g., a mounting hole in an automobile chassis), an inertial sensor 14 (see FIGS. 2 and 3A–3D) for detecting a selected type of motion, and an interface port 16 for communicating with an external apparatus (e.g. a computer within the automobile). The interface port 16 has both the mechanical coupling structure for coupling with a wiring harness, and one or more leads for electrically communicating with an external electronic device.

The fastener 12 may be any fastener known in the art. In the example of FIG. 1, the fastener 12 is a metallic bolt having a head 18 and threaded shaft 20 for mating with a mounting hole in the automobile chassis. The outer diameter of the shaft 20 may be selected as a function of the mounting hole to which it is to be secured. For example, the outer diameter could be sized to fit a mounting hole having an inner diameter of 0.5 inches. Of course, the outer dimension can be a variety of different sizes to fit many different hole sizes.

Discussion of the fastener 12 as a threaded, metallic bolt is exemplary only. Accordingly, as noted above, different embodiments can use different types of fasteners. For example, among other things, the fastener 12 can take the form an unthreaded bolt, a nail, a cotter pin, a tack, a snap, and a wall anchor. Different materials also may be used depending upon the application. For example, the bolt may be produced from a plastic or ceramic material. Discussion of the bolt shown in FIG. 1 thus is not intended to limit the scope of many discussed embodiments.

Figure 2:
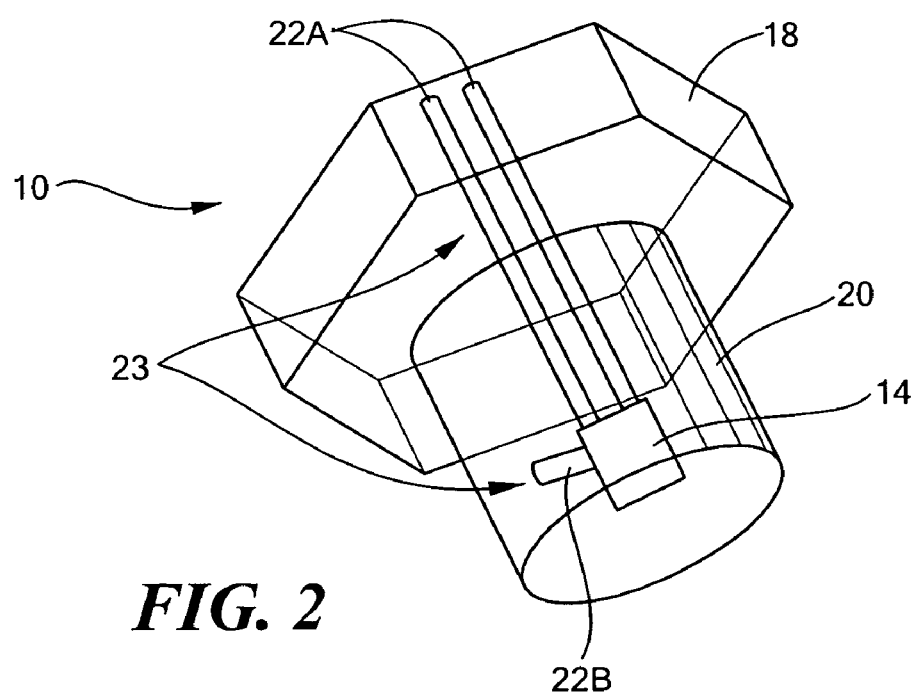
FIG. 2 schematically shows an interior view of the satellite sensor of FIG. 1.

FIG. 2 schematically shows a view of the satellite sensor 10 shown in FIG. 1 where the walls of the bolt are transparent. Specifically, FIG. 2 shows the inertial sensor 14, which is mounted to an internal wall of the shaft 20 of the bolt, and a plurality of leads 22A and 22B extending from the inertial sensor 14. Specifically, a pair of communication leads 22A electrically connects the inertial sensor 14 with the interface port 16, while a bolt down detect lead 22B electrically connects the inertial sensor 14 with the side wall of the bolt. The inertial sensor 14 thus may transmit signals carrying motion information to the external computer through the pair of communication leads 22A. As known by those skilled in the art, based upon the application, such signals may be processed in some manner, such as by analog to digital converters, pulse width modulators, etc. . . . In addition, as discussed in greater detail below, by detecting current in the bolt down detect lead 22B, bolt down detect logic within the sensor 14 (or external to the sensor 14) determines if the satellite sensor 10 is secured to an automobile chassis.

The inertial sensor 14 may be any such sensor known in the art. For example, as suggested above, the inertial sensor 14 may be a MEMS device implemented as an accelerometer or gyroscope. Of course, other embodiments may be used with other types of devices. In fact, some embodiments may be used with non-MEMS devices or general integrated circuits. Accordingly, discussion of inertial sensors, such as MEMS accelerometers and gyroscopes, is exemplary and not intended to limit the scope of various embodiments.

Figure 3A:
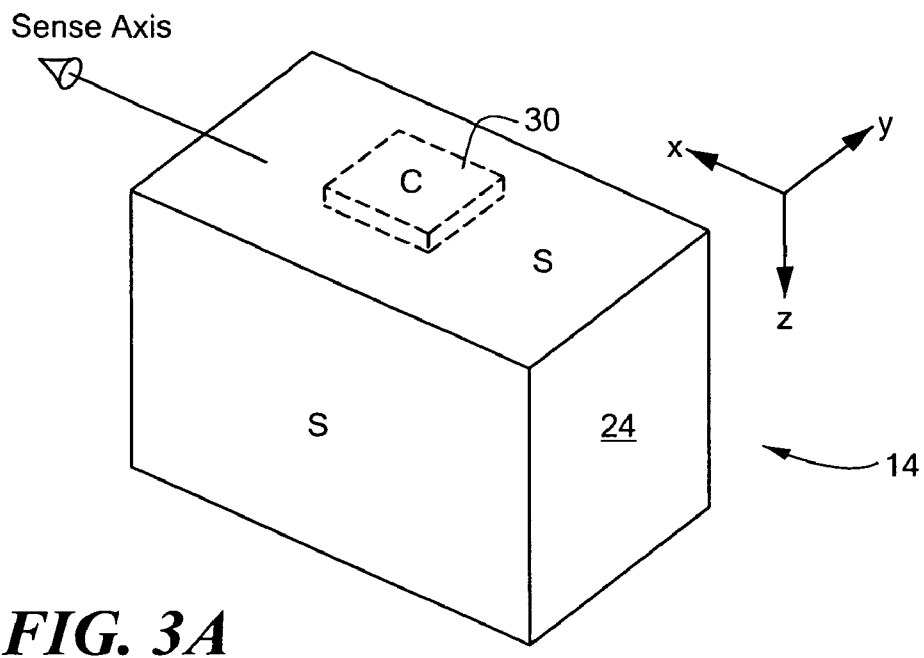
FIG. 3A schematically shows a perspective view of a MEMS inertial sensor that may be a part of the satellite sensor in FIG. 1.

FIG. 3A schematically shows an inertial sensor 14 that may be used in the satellite sensors 10 discussed herein. The inertial sensor 14 may be any such sensor in the art. For example, the inertial sensor 14 may have a conventional package 24 that contains one or more die (not shown) having structure and circuitry for implementing the underlying function. Note that the inertial sensor 14 shown in FIG. 3A is not necessarily drawn to scale.

When implemented as an accelerometer, the inertial sensor 14 may have a mass suspended above a die, and circuitry for detecting mass movement. The die also may have standard transmit circuitry for forwarding information relating to detected mass movement to an external device via the interface port 16. Alternatively, the logic may be distributed across multiple die. Illustrative embodiments integrate the accelerometer functionality (structure and circuitry) on a single die. Exemplary MEMS accelerometers include those distributed and patented by Analog Devices, Inc. of Norwood, Mass. Among others, see U.S. Pat. No. 5,939,633, the disclosure of which is incorporated herein, in its entirety, by reference.

When implemented as a gyroscope, the inertial sensor 14 may have an oscillating mass suspended above a die, and circuitry for actuating and detecting mass movement. In a manner similar to the above noted accelerometers, the die also may have standard transmit circuitry for forwarding information relating to certain mass movement to an external device via the interface port 16. Illustrative embodiments integrate the gyroscope functionality (structure and circuitry) on a single die. Exemplary MEMS gyroscopes include those distributed and patented by Analog Devices, Inc. of Norwood, Mass. Among others, see U.S. Pat. No. 6,505,511, the disclosure of which is incorporated herein, in its entirety, by reference.

In the position shown in FIG. 3A, the inertial sensor 14 has a sense axis that is substantially parallel with the X-axis. If implemented as an accelerometer, then the inertial sensor 14 senses motion along the X-axis (i.e., along its longitudinal axis). In a similar manner, if implemented as a gyroscope, then the inertial sensor 14 shown in FIG. 3A senses motion about the X-axis (i.e., rotation about the X-axis). Of course, those in the art understand that the inertial sensor 14 can have multiple sense axes. Nevertheless, only one sense axis is discussed herein for simplicity.

Figure 3B:
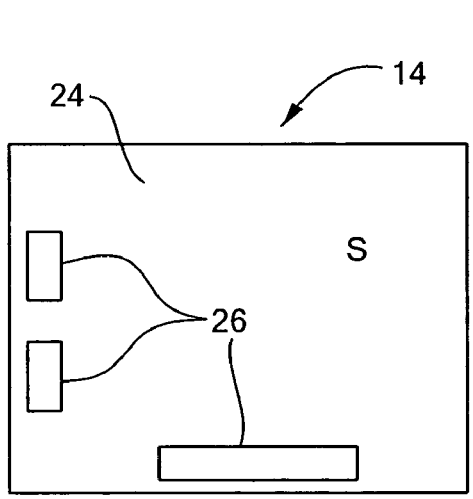
FIG. 3B schematically shows a bottom view of the MEMS sensor shown in FIG. 3A.

FIG. 3B schematically shows a bottom view of the inertial sensor 14, which clearly shows the contact pattern on the sensor bottom face. The pattern shown has three metallic contacts 26. Two of the contacts 26 transmit and receive information relating to the basic inertial sensing function of the inertial sensor 14 (i.e., via the pair of communication leads 22A). The remaining contact delivers bolt down detect signals to the fastener 12 (i.e., via the bolt down detect lead 22B). Details of the bolt down detect signals are discussed below.

Figure 3C:
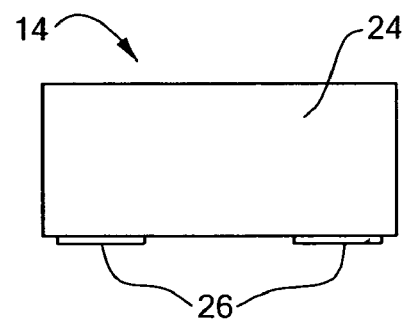
FIG. 3C schematically shows a side view of the MEMS sensor shown in FIG. 3A.

As noted above and discussed in greater detail in FIG. 4, each sensor contact 26 is mounted to a lead 22A or 22B. In illustrative embodiments, the leads 22A and 22B form a leadframe 23. Accordingly, the land pattern of the leadframe 23 preferably is configured to match that of the contact pattern on the bottom face of the inertial sensor 14. Moreover, the contacts 26 illustratively are substantially coplanar or extend slightly from the bottom face. FIG. 3C exemplifies this relationship. Substantially flat contacts 26 produced in this manner should facilitate processes that couple the contacts 26 to the leadframe 23 (discussed below).

Figure 3D:
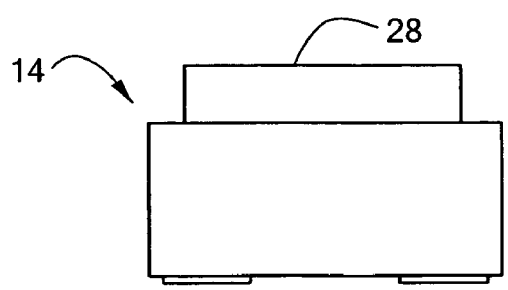
FIG. 3D schematically shows a side view of another MEMS sensor that may be used in the satellite sensor shown in FIG. 1.

Inertial sensors having different types of packages can be used. In fact, rather than use the package 24, the inertial sensor 14 can have a cap 28 that seals the die on which the functionality is formed. The seal illustratively may be a particle shield or hermetic. As an example, FIG. 3D schematically shows a capped integrated circuit with a hermetic seal. Other embodiments may include a wireless sensor or a leaded package.

Figure 4:
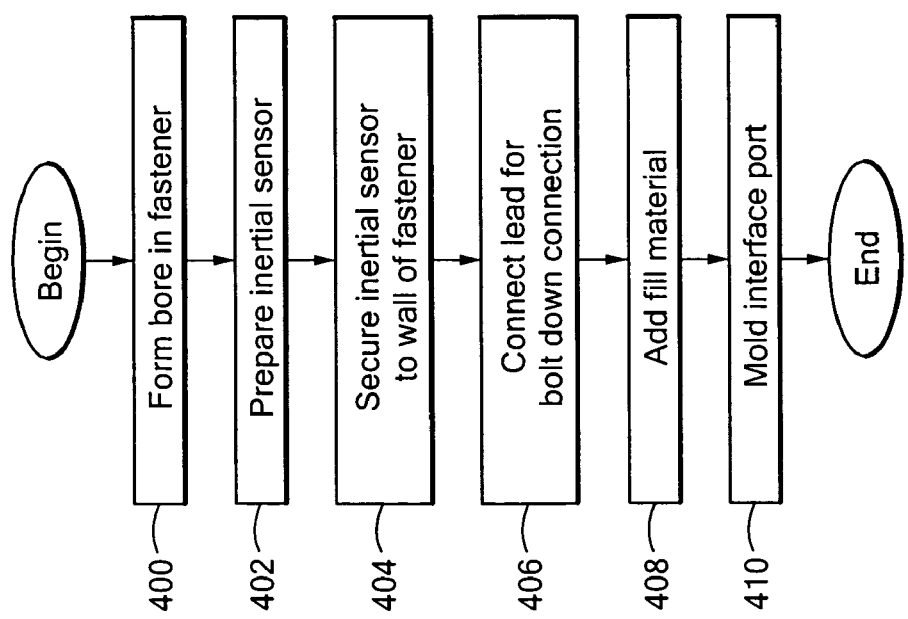
FIG. 4 shows a process of forming the satellite sensor shown in FIG. 1 in accordance with illustrative embodiments of the invention.

FIG. 4 shows an illustrative process of forming the satellite sensor 10 shown in FIGS. 1 and 2. The process begins at step 400, in which conventional processes form a bore in the fastener 12. To that end, the bolt, which initially is solid metal, is drilled to form the bore. In the embodiments shown in FIGS. 1 and 2, the bore extends into the shaft 20 and has a substantially uniform inner dimension. In alternative embodiments, however, the bore has an irregular inner dimension, and/or may not extend into the shaft 20.

Either before, after, or at roughly the same time, the inertial sensor 14 is prepared for insertion into the bore (step 402). In particular, the leads 22A and 22B are secured to the inertial sensor 14. As noted above, the leads 22A and 22B are a part of a leadframe 23 having a land pattern that matches that of the contacts 26 on the inertial sensor 14. The land pattern illustratively is formed so that when coupled with the inertial sensor 14, its sense axis is aligned in a predetermined direction. Similar processes to those discussed in the above noted incorporated U.S. patent application can be used to secure the inertial sensor 14 to the leadframe 23.

More specifically, conventional processes both electrically and mechanically connect a plurality of metallic contacts 26 on the inertial sensor 14 (see FIGS. 3A–3C) to the leadframe 23—no wire bonds are necessary, although some embodiments may use them. One embodiment uses reflow solder process (i.e., IR reflow) to make that connection. Prior to soldering, however, the inertial sensor 14 may be tacked into position on the leadframe 23 with a low tack adhesive.

If high temperature processes (e.g., soldering) are used to secure the inertial sensor 14 to the leadframe 23, then components of the inertial sensor 14 should be able to withstand the temperatures generated during such a process (e.g., between 245 and 265 degrees C.). If not, then lower temperature processes can be used. For example, a conductive adhesive can make the connection. Alternatively, localized laser reflow soldering or surface mounting techniques can be used.

To facilitate coupling with the leadframe 23, the contacts 26 on the bottom face of the inertial sensor 14 may have solder pads or solder bump connections. Depending on the finish of the contact pattern, these alternative components may eliminate the need for solder paste to be dispensed or screened onto the package 24 prior to attaching the inertial sensor 14.

After soldering, the pair of communication leads 22A may be bent or insulated to prevent electrical contact with the bolt. The leadframe 23 also may be bent if the desired axis of sensitivity is to be the Z-axis of the bolt (i.e., substantially orthogonal to the longitudinal axis of the shaft 20 as shown in FIG. 1). Moreover, the leadframe 23 may be bent even if the desired axis of sensitivity is along the X-axis of the bolt. Details of the noted incorporated U.S. patent application discuss such considerations. Also after soldering, an adhesive may be applied to a surface of the inertial sensor 14. As noted below, the adhesive is applied as a function of the sense axis of the inertial sensor 14 and the desired sense axis of the overall satellite sensor 10.

After the inertial sensor 14 is prepared, it is secured to the internal wall of the fastener 12 (step 404). The inertial sensor 14 must be secured in a manner that properly orients its sense axis. For example, if the satellite sensor 10 is to have a sense axis along its longitudinal axis (i.e., along the X-axis), then the inertial sensor 14 of FIG. 3A can be secured to the side wall of the bore with any of its sides identified as "S" (in FIGS. 3A and 3B). If the inertial sensor 14 is to be mounted to a bottom surface of the bore, then its other sides may be used to secure it to the interior of the bore.

If the satellite sensor 10 is to have Z-axis sensitivity (and the leadframe 23 is bent to a substantially ninety degree angle with the bottom side of the inertial sensor 14), then the top side of the inertial sensor 14 can be mounted to the bottom wall of the bore. Of course, those in the art should understand that the inertial sensor 14 can be mounted in other ways and with other surfaces. Accordingly, discussion of specific sides is exemplary and not intended to limit various embodiments of the invention.

Any conventional means consistent with the goals of various embodiments may be used to secure the inertial sensor 14 to the bore wall. For example, the adhesive noted with regard to step 402 may be all that is necessary. Moreover, depending upon the material forming the package 24, the inertial sensor 14 may be soldered or ultrasonically welded to the bore wall.

In alternative embodiments, rather than being secured directly to the bore wall, the inertial sensor 14 is encapsulated in a specially shaped housing or insert and then secured within the bolt. For example, in such embodiments, such a housing may be injection molded to a shape that mates with the bore in a predefined manner.

After the inertial sensor 14 is secured to the bore wall (or otherwise within the bore), the pair of communication leads 22A are oriented so that they extend to the interface port 16. Additionally, conventional processes connect the bolt down protect lead directly to the bore wall. In summary, as discussed in greater detail in the incorporated U.S. patent application and noted above, the inertial sensor 14 has logic for determining if the bolt is secured to an automobile chassis. Specifically, when secured to a metallic automobile chassis, the bolt electrically contacts the automobile chassis, which connects the bolt to ground. Such contact closes a ground connect circuit between the inertial sensor 14 and bolt, thus permitting a limited current to flow toward ground. This circuit extends from 1) the logic on the inertial sensor 14, 2) to the leadframe 23, 3) to the bolt, and then 4) to the chassis.

Upon detection of this current, circuitry 30 (shown schematically and in phantom in FIG. 3A) can transmit a "connect signal" to an external computer indicating that the satellite sensor 10 is secured to the chassis. If no such signal is transmitted, the computer can light a warning light in the dash of the automobile.

Conventional circuitry in the inertial sensor 14 both generates and senses this current. Such circuitry simply can be a resistor (not shown) serially coupled between a voltage source and the bolt down detect lead 22B. The bolt down connection can be, among other things, a leaf spring or other compliant apparatus that completes an electrical contact when slid into the bore of the fastener 12. When circuitry detects a voltage across the resistor, it may generate a signal (i.e., the above noted connect signal) indicating that the satellite sensor 10 is coupled with the chassis.

Returning to the process of FIG. 4, after the bolt down detect lead 22B is connected to the bolt, the process continues to step 408, in which a fill material (optionally) is added to the bore. Among others, the fill material may be a silicone rubber potting material or a curable plastic. In addition to filling the bore, the fill material should add further support to the inertial sensor 14. As an optional step, the inertial sensor 14 may be at least partially encapsulated with a resilient, elastomeric relief material (e.g., silicone) before filling the bore. The relief material should enable the inertial sensor 14 to expand and contract during use and when the bore is being filled.

The process then continues to step 410, in which conventional processes form the interface port 16. To that end, the pair of communication leads 22A may be bent or otherwise manipulated, if necessary, to form leads that can couple with the intended complimentary parts in a wiring harness. Moreover, the assembly in its then current form is molded (e.g., via insert molding processes) to form the interface port 16. In illustrative embodiments, the interface port 16 is formed with a plastic shroud around the leads. The shroud can have clips to snap-fit with the complimentarily shaped wiring harness.

The process shown in FIG. 2 thus forms a satellite sensor 10 having an inertial sensor integrated into a fastener. It should be noted that the process may be executed in a different order than that discussed, and may omit some steps. Moreover, the process may benefit from additional steps. The process of FIG. 4 thus is intended to be an outline for a process of producing the satellite sensor 10. Those in the art understand that additional steps may be taken to enhance the process, such as testing the components at various stages of development.

Figure 5:
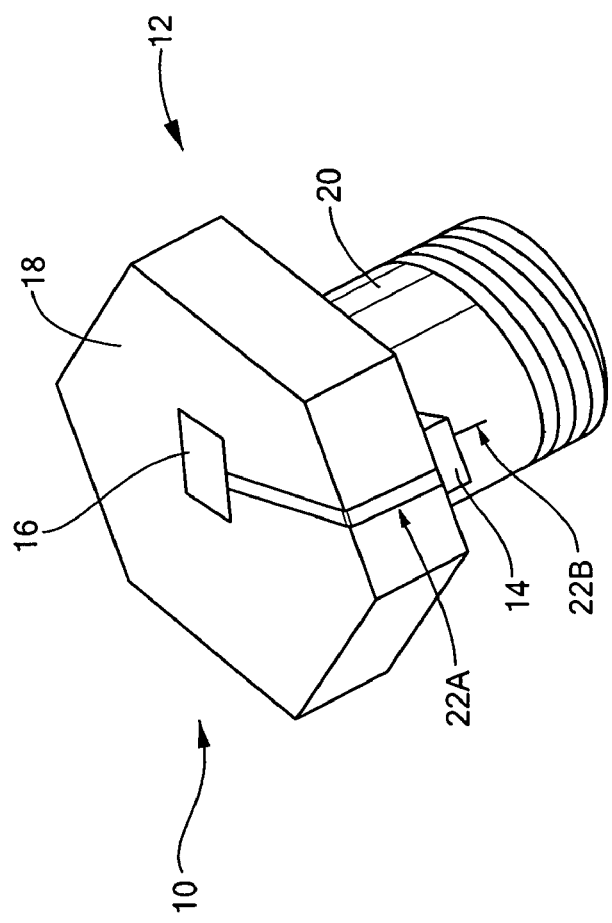
FIG. 5 schematically shows an alternative embodiment of the invention having an inertial sensor mounted to the exterior of a fastener.

In alternative embodiments, rather than being within the fastener 12, the inertial sensor 14 is mounted to the outside surface of the fastener 12. FIG. 5 shows one such embodiment, in which the inertial sensor 14 is mounted to the outside surface of the bolt, near the top of the shaft 20. The pair of communication leads 22A extend along the outside of the bolt to the interface port 16. Of course, in a manner similar to other embodiments, the interface port 16 can be in a location other than the top of the bolt, such as on the shaft 20.

A technician thus can install the satellite sensor 10 simply by screwing the bolt into a mounting hole in the automobile chassis. If the desired axis of sensitivity is the X-axis, then the technician can merely screw the bolt into the hole to any random point that adequately secures it. If the desired axis of sensitivity is other than the X-axis (e.g., the Y-axis or Z-axis), then the technician must be certain to rotate the bolt a pre-set number of times (or multiple thereof) to ensure alignment. To that end, the threads may be formed to prevent further rotation after a certain point. Alternatively, or additionally, the head 18 of the bolt may have a level line identifying the proper orientation. For example, when the level line on the head 18 is horizontal, the inertial sensor 14 is properly aligned. As yet another example, shims or washers could be inserted under the fastener head to simultaneously assure proper torque and orientation.

Those skilled in the art should understand that devices with the functionality of the disclosed satellite sensors 10 may be coupled with a wide variety of external objects, such as airplanes, hand-held video games, global positioning systems, and missiles. Accordingly, discussion of its use with automobiles is exemplary and thus, not intended to limit various embodiments of the invention.

Although the above discussion discloses various exemplary embodiments of the invention, it should be apparent that those skilled in the art can make various modifications that will achieve some of the advantages of the invention without departing from the true scope of the invention.

What is claimed is:

1. A motion detector capable of sensing motion of an object to which the motion detector is coupled, the motion detector comprising:

a fastener having a plurality of surfaces, the fastener being directly coupleable with the object; and a motion sensor secured to one of the plurality of surfaces of the fastener such that the motion sensor does not move in any direction with respect to the surface of the fastener to which the motion sensor is secured, wherein the motion sensor includes connect detection circuitry, the connect detection circuitry being capable of determining if the fastener is coupled with the object, the connect detection circuitry being in electrical communication with one of the plurality of surfaces of the fastener.

2. The motion detector as defined by claim 1 wherein the motion sensor comprises a package, the package being secured to one of the plurality of surfaces of the fastener.

3. The motion detector as defined by claim 1 wherein the fastener has an outer surface with at least one thread.

4. The motion detector as defined by claim 1 wherein the fastener is a bolt.

5. The motion detector as defined by claim 1 wherein the fastener has a shaft forming an interior surface, the motion sensor being secured to the interior surface.

6. The motion detector as defined by claim 5 wherein the interior surface defines a bore, the bore being filled with a fill material.

7. The motion detector as defined by claim 1 wherein the motion sensor has a sense axis and the fastener has a longitudinal axis, the sense axis being aligned to be either substantially parallel to or substantially normal to the longitudinal axis.

8. The motion detector as defined by claim 1 wherein the fastener includes an exterior surface, the motion sensor being secured to the exterior surface.

9. A motion detector capable of sensing motion of an object to which the motion detector is coupled, the motion detector comprising:

means for directly coupling with the object, the directly coupling means having a plurality of surfaces; and means for sensing motion of the object, the sensing means being secured to one of the plurality of surfaces of the directly coupling means such that the motion sensing means does not move in any direction with respect to the surface of the directly coupling means to which the motion sensing means is secured, wherein the means for sensing motion includes connect detection means, the connect detection means being capable of determining if the directly coupling means is coupled with the object, the connect detection means being in electrical communication with one of the plurality of surfaces of the directly coupling means.

10. The motion detector as defined by claim 9 wherein the means for directly coupling includes a fastener.

11. The motion detector as defined by claim 9 wherein the sensing means includes an accelerometer or a gyroscope.

12. The motion detector as defined by claim 9 wherein the directly coupling means includes a shaft forming an interior surface, the sensing means being secured to the interior surface.

13. The motion detector as defined by claim 9 wherein the sensing means includes a package secured to one of the plurality of surfaces of the directly coupling means.

14. A method of producing a motion detector, the method comprising:
providing a fastener having a plurality of surfaces; and
directly securing a motion sensor to one of the plurality of surfaces such that the motion sensor does not move in any direction with respect to the surface of the fastener to which the motion sensor is secured, wherein the motion sensor includes connect detection circuitry, the connect detection circuitry being capable of determining if the fastener is coupled with the object, the connect detection circuitry being in electrical communication with one of the plurality of surfaces of the fastener.

15. The method as defined by claim 14 further including forming a bore in the fastener, the motion sensor being secured within the bore.

16. The method as defined by claim 15 further comprising filling the bore with a fill material.

17. The method as defined by claim 15 wherein the motion sensor includes a sense axis and the fastener includes a longitudinal axis, directly securing including aligning the sense axis of the motion sensor to be either substantially parallel to or substantially normal to the longitudinal axis of the fastener.

18. An apparatus formed in accordance with the process of claim 14.

19. A motion detector capable of sensing motion of an object to which the motion detector is coupled, the motion detector comprising:
a fastener having an interior, the fastener being directly coupleable with the object; and
a motion sensor within the interior of the fastener, wherein the motion sensor includes connect detection circuitry, the connect detection circuitry being capable of determining if the fastener is coupled with the object, the connect detection circuitry being in electrical communication with one of the plurality of surfaces of the fastener.

20. The motion detector as defined by claim 19 wherein the fastener forms a bore that contains the motion sensor, the bore being filled by a fill material.

* * * * *